United States Patent [19]

Tsunoda et al.

[11] 4,359,714
[45] Nov. 16, 1982

[54] VOICE WARNING SYSTEM FOR AN AUTOMOTIVE VEHICLE

[75] Inventors: Masakazu Tsunoda, Fujisawa; Kazuyuki Mori, Yokohama, both of Japan

[73] Assignee: Nissan Motor Company, Limited, Kanagawa, Japan

[21] Appl. No.: 199,709

[22] Filed: Oct. 23, 1980

[30] Foreign Application Priority Data

Oct. 24, 1980 [JP] Japan .................. 54-136432

[51] Int. Cl.³ ............................. B60Q 5/00
[52] U.S. Cl. .................. 340/52 F; 340/517; 179/1 SA; 179/1 SM
[58] Field of Search ........... 340/517, 27 R, 52 F, 340/521, 529; 179/1 SA, 1 SM, 1 SG

[56] References Cited

U.S. PATENT DOCUMENTS

| | | | |
|---|---|---|---|
| 3,538,264 | 11/1970 | Van Dyke | 340/27 R |
| 3,641,496 | 2/1972 | Slavin | 179/1 SM |
| 3,808,591 | 4/1974 | Panicello et al. | 340/27 R |
| 3,823,383 | 7/1974 | Mallinger | |
| 3,859,629 | 1/1975 | Komiyama et al. | |
| 3,870,818 | 3/1975 | Barton et al. | 340/52 F |

FOREIGN PATENT DOCUMENTS 2311801 9/1973 Fed. Rep. of Germany .
2714621 10/1978 Fed. Rep. of Germany .
2848101 4/1980 Fed. Rep. of Germany .

*Primary Examiner*—Alvin H. Waring
*Attorney, Agent, or Firm*—Lowe, King, Price & Becker

[57] ABSTRACT

A voice warning system for an automotive vehicle such that warning information is first indicated to the driver in voice form when car-radio sound volume is reduced, and next in alarm sound form, without reducing the car-radio sound volume, until the driver takes a proper action. The system thus improved comprises a discriminator having a memory, a coincidence counter, a gate, AND circuits, and OR circuits, and an alarm generator, in addition to sensors and a voice output unit.

6 Claims, 4 Drawing Figures

VOICE WARNING SYSTEM FOR AN AUTOMOTIVE VEHICLE

BACKGROUND OF THE INVENTION

1. Field of the Invention

The present invention relates generally to a voice warning system for an automotive vehicle, and more particularly to a voice warning system such that information is indicated to the driver in voice form only once when car-radio sound volume is reduced and, thereafter, an alarm sound is produced until the driver takes a proper action.

2. Description of the Prior Art

Heretofore, there have been used various warning lamps and alarm buzzers or chimes for informing the driver of various warning information on, for instance, unclosed door, seat-belt putting-on, lamp putting-out, shortage of fuel, coolant, battery liquid, washer liquid and so on.

However, since such lamps inform the driver of various information visually, it is sometimes easy for the driver to fail to notice the warning and fail to take appropriate actions against the warning.

On the other hand, in the case of alarm sound, although a driver's attention is well called to the sound, the driver cannot in general distinguish between many different alarm sounds and, therefore, it is impossible to indicate complex information to the driver. For example, if used with a speed warning system which can warn the driver of an excessive speed when an actual vehicle speed exceeds a predetermined set speed, the alarm sound cannot inform the driver of how much the vehicle speed exceeds the set speed.

Therefore, the present inventors have proposed a voice warning system by which various warning information is indicated to the driver, in voice form, accurately and correctly. When this system is used for warning vehicle speed, it is possible to inform the driver of the degree of the excessive speed.

In this system, however, it is very noisy to repeat the same voice information again and again and it is very dangerous to output voice information only once, because the driver may fail to notice the warning or forget it.

In addition, in the case other audio devices are provided in the same vehicle, although it is necessary to reduce the sound volume from the audio devices, it is not preferable to reduce the sound volume whenever the same voice information is repeated.

BRIEF SUMMARY OF THE INVENTION

With these problems in mind therefore, it is the primary object of the present invention to provide a voice warning system for an automotive vehicle such that voice information is first indicated to the driver only once and then an alarm sound is produced without outputting voice information, provided that the same voice information is indicated to the driver. Accordingly, with the voice information system of the present invention, it is possible to eliminate an annoyance such that the same voice information is produced repeatedly and to prevent the driver from forgetting the warning.

To achieve the above-mentioned object, the voice warning system of the present invention comprises a discriminator to check whether the warning information varies or not and an alarm generator, in addition to a voice warning system.

BRIEF DESCRIPTION OF THE DRAWINGS

The features and advantages of the voice warning system according to the present invention will be more clearly appreciated from the following description taken in conjunction with the accompanying drawings in which.

DETAILED DESCRIPTION OF THE PREFERRED EMBODIMENTS

Figure 1:
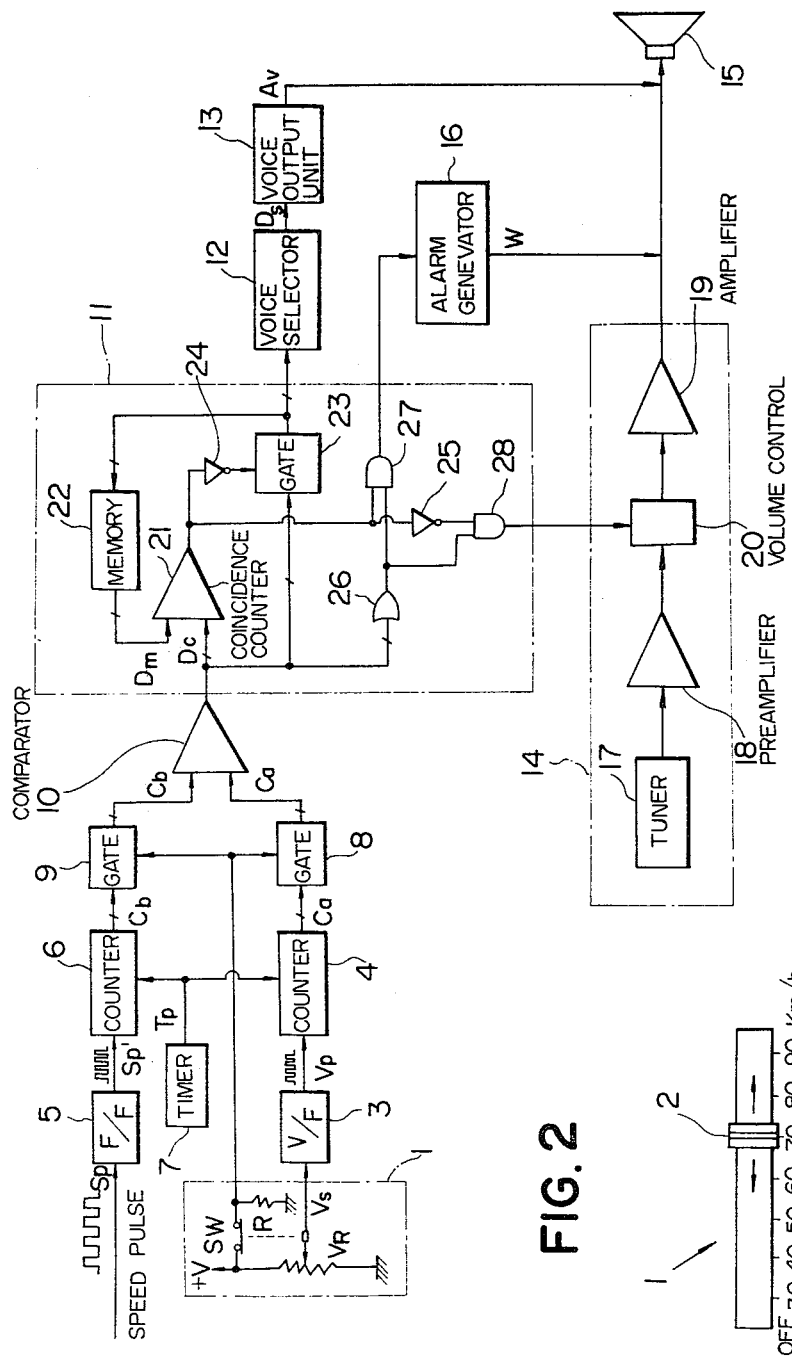
FIG. 1 is a schematic block diagram of an embodiment of the present invention.

Reference is now made to the figures, and more specifically to FIG. 1, wherein a first embodiment of the present invention is illustrated.

Figure 2:
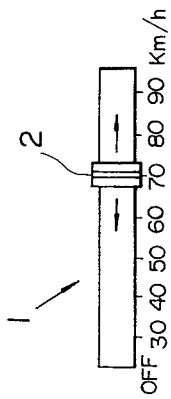
FIG. 2 is an example illustration of a speed-setting lever used with a speed warning system.

In FIG. 1, the numeral 1 denotes a speed setting unit, in which a switch is turned off when a speed setting lever 2 of FIG. 2 is shifted to the leftmost position, and is turned on, to output a voltage signal $V_s$ according to a speed preset by using a variable resistor $V_R$, when the lever 2 is shifted toward the right. The voltage signal $V_s$ is converted into a pulse signal $V_P$ having a frequency proportional to the voltage $V_s$ through a V-F converter 3 such as, for example, a variable frequency oscillator of voltage control type (VCO), and is then counted by a counter 4.

On the other hand, a vehicle speed pulse $S_p$ generated in synchronization with the revolution of the transmission shaft is first converted into a voltage pulse signal $S_p'$ having a higher frequency through a frequency converter (F-F) 5, and then counted by another counter 6. Both the input gates of the counters 4 and 6 are opened or closed, so that the counters 4 and 6 can send output signals $C_a$ and $C_b$, to the next stage by a pulse signal $T_p$ outputted from a timer 7 at a constant time interval (extremely short). The conversion ratios of the V-F and F-F converters 3 and 5 and a period of the pulse $T_p$ from the timer 7 are determined so that the counter output $C_a$ outputted from the counter 4 may be a digital value indicating the set speed and the counter output $C_b$ outputted from the counter 6 may be a digital value indicating the actual speed.

When the switch of the speed setting unit 1 is off, the gate inputs of gate circuits 8 and 9 are at a "L" level because both the gate inputs are grounded through a resister R and therefore both the gates are kept closed; however, when the switch is turned on by the speed setting lever 2, the gate input changes to a "H" level and therefore both the gates are opened. Thus, the counter outputs $C_a$ and $C_b$ from the counters 4 and 6 are inputted to a digital comparator 10, synchronizing with the pulse $T_p$ from the timer 7.

The digital comparator 10 compares the counter outputs $C_a$ with $C_b$; and generates a step-up excess speed information signal based on the actual vehicle speed and the set speed, in such a way that if $C_b$ (counter output for an actual speed) exceeds $C_a$ (counter output for a set speed) by a first step-up difference (e.g. 5 Km/h) ($C_a \geq C_b + 5$), the first voltage value is outputted, and if $C_b$ exceeds $C_a$ by a second step-up difference (e.g. 10 Km/h) ($C_a \geq C_b + 10$), the second voltage value is outputted. Therefore, if $C_a$ is less then $C_b$ or the difference between the two is less than the first step-up voltage difference ($C_a < C_b + 5$), no signal is outputted from the digital counter 10.

The excess speed information signal $D_c$ outputted from the digital comparator 10 is inputted to a voice selector 12 through a discriminator 11 (described later). This voice selector 12 selects voice to be outputted, in accordance with the excess speed information signal $D_c$, such as "Speed is over by 5 Km/h." or "Excess speed is 10 Km/h", and outputs a voice designation signal $D_s$ as a many-bit binary signal (address signal) to the next stage.

The numeral 13 denotes a voice output unit. For this unit, it is possible to use the various devices such as a sound reproducing device using magnetic recording medium of tape, drum or disk, a voice generator in which voice is stored in semiconductor memory using pulse coding method, or a voice synthesizer based on linear prediction coding system developed by Texas Instrument Incorporated of the USA (explained later in more detail). In this voice output device 13, necessary information is previously stored, or else is synthesized according to the necessity, and voice signal $A_v$ is outputted in accordance with voice designation signal $D_s$ from the voice selector 12. The voice signal $A_v$ is next reproduced through a speaker 15 used with a car-radio 14 in order to inform the driver of excess speed information in voice form.

The numeral 16 denotes an alarm generator, which generates an output signal W, when activated, to produce an alarm sound or oscillator sound through the same speaker 15. In this case, as is well known, the car-radio 14 comprises a tuner 17, a preamplifier 18, an amplifier 19, and a volume control 20 for controlling the sound volume.

Next, the construction and operation of the discriminator 11 will be explained below in more detail, which is the essential circuit of the present invention. The discriminator 11 is a circuit for discriminating whether or not the excess speed information signal $D_c$ outputted from the digital comparator 10 as a warning information signal is changed, including a coincidence counter 21, a memory 22, a gate circuit 23, inverters 24 and 25, an OR circuit 26, and AND circuits 27 and 28.

The excess speed information signal inputted to the voice selector 12 though the gate circuit 23 is temporarily stored in the memory 22. And, the current excess speed information signal $D_c$ outputted from the digital comparator 10 and the preceding excess speed information signal $D_m$ stored in the memory 22 are inputted to the coincidence counter 21 for comparison. If the two information signals are different from each other, the output is at a "L" level; if the same, the output is at a "H" level.

When the output of the coincidence counter 21 is at a "L" level, the output of the inverter 24 changes to a "H" level to open the gate circuit 23 and therefore the excess speed information $D_c$ outputted from the digital comparator 10 is inputted to the voice selector 12 through the gate circuit 23 to activate the voice output unit 13, with the result that a voice message such as "Excess speed is 5 Km/h" is produced through the speaker 15.

In this case, the output of the inverter 25 also changes to a "H" level. Since the excess speed information signal $D_c$ is inputted to the OR circuit 26 and at least either of bits is "H" level, the output is also at a "H" level. Therefore, the output of the AND circuit 28 is changed to a "H" level to operate the volume control 20 and therefore car-radio sound volume is reduced. If the control 20 is an electronic volume control (electronic variable resister), the control 20 is directly controlled electrically; if the control 20 is a usual volume control (mechanical variable resister), a switching element to connect a muting resister in parallel thereto is turned on by the signal from the AND circuit 28. The sound volume of the car-radio 14 may be reduced to almost zero, where necessary. Further, in this case, since one of the input of AND circuit 27 is at a "L" level, the output is also at a "L" level, therefore the alarm generator 16 does not operate.

After an excess speed information signal $D_c$ has been stored in the memory 22, the signal $D_c$ outputted from the digital comparator 10 does not change, provided that the speed is the same. Accordingly, both the input information signals for the coincidence counter 21 coincide with each other to change the output to a "H" level. Then, the output of the inverter 24 changes to a "L" level; the gate 23 closes; the excess speed information signal $D_c$ is not inputted to the voice selector 12; thus no voice information is produced.

On the other hand, since the output of the AND circuit 27 changes to a "H" level, the alarm generator 16 operates to generate an alarm signal W, and an alarm sound is produced through the speaker 15. In this case, it may be preferable to use an intermittent alarm sound rather than a continuous alarm sound. Further, since the output of the inverter 25 is at a "L" level, the output of the AND circuit 28 is also at a "L" level, and the volume control 20 is not controlled, with the result that car-radio sound volume is not reduced.

As explained above, when an excess speed information signal $D_c$ outputted from the digital comparator 10 changes, voice information according to the signal $D_c$ is outputted and the car-radio sound volume is reduced. When the excess speed information does not change, no voice information is outputted, the car-radio sound volume is not reduced, and only the alarm sound is produced.

On the other hand, if the actual speed drops below the preset speed, the excess speed information $D_c$ becomes zero. In this case, since the output of the coincidence counter 21 changes once to a "L" level, the output of the inverter 25 changes to a "H" level. However, since all the inputs of the OR circuit 26 are at "L" levels, the output of the OR 26 is at a "L" level. Also, since the output of the AND circuit 28 is at a "L" level, the car-radio sound volume is not reduced.

Thereafter, when the memory 22 becomes empty, since the output of the coincidence counter 21 is high and the output of the OR circuit 26 is low, the output of the OR circuit 27 is low without activating the alarm generator 16. Further, in the case where other audio equipment such as a car stereo or car TV is provided in the same vehicle in addition to the car-radio 14, it is preferable to reduce these sounds when excess speed information is indicated to the driver.

Figure 3:
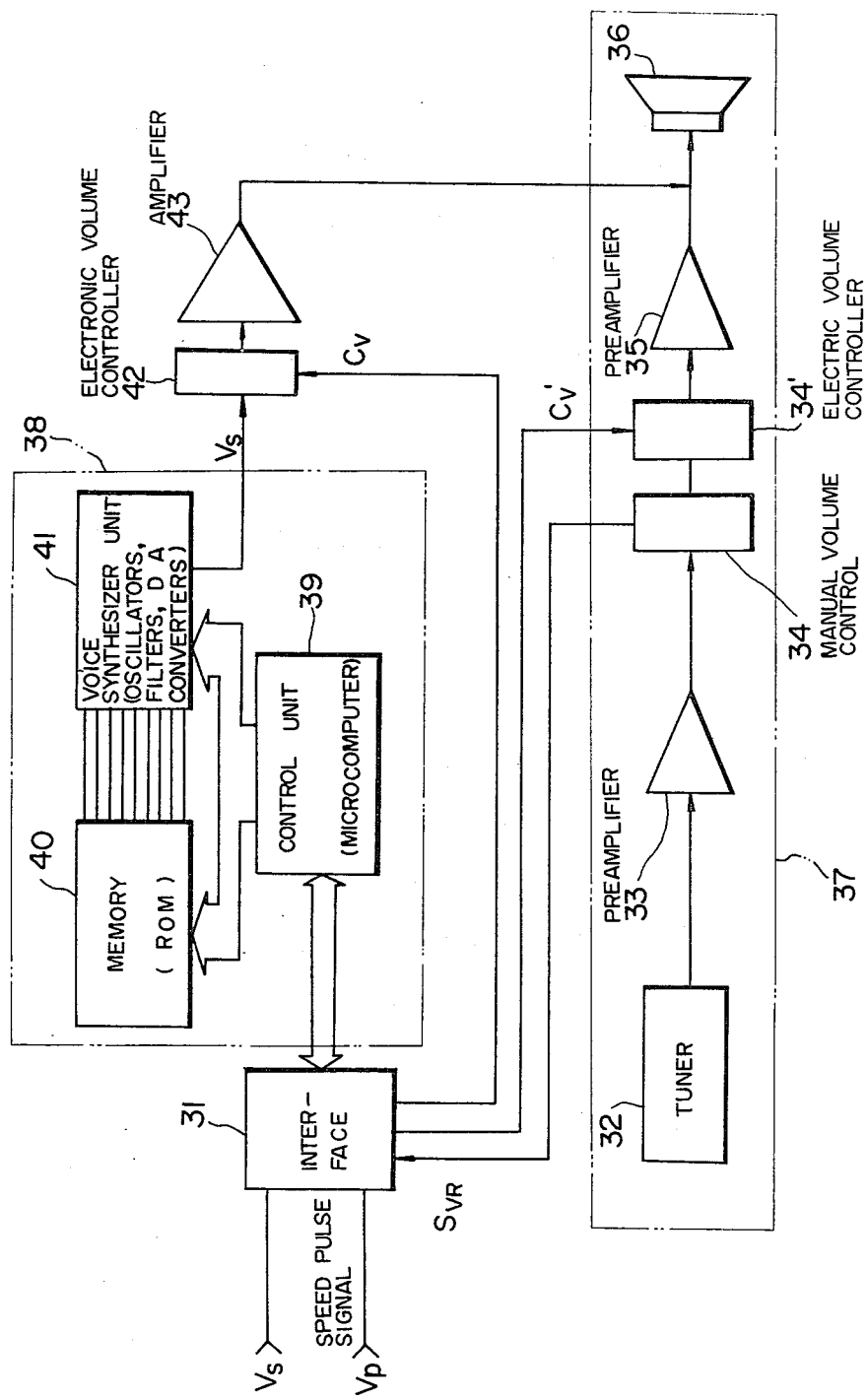
FIG. 3 is a schematic block diagram of another embodiment of the present invention.

Reference is now made to FIG. 3, wherein a second embodiment of the present invention is illustrated.

In FIG. 3, the numeral 31 denotes an input/output interface for a microcomputer, which includes, for example, an F-F converter, a V-F converter and a multiplexer. To the interface 31 are inputted a voltage signal $V_s$ proportional to a set speed preset by the speed setting lever, a speed signal $V_p$ having a frequency proportional to the actual speed signal from a speed sensor, and a volume control signal $S_{VR}$ indicating a sound volume value as adjusted by a volume control (variable resister) 34 in a car-radio 37. In this case, the car-radio 37 comprises a tuner 32, a preamplifier 33, the manual volume control 34, an electronic volume control 34', an amplifier 35 and a speaker 36.

Further, in this case, the voltage signal $V_s$ and the signal $V_{VR}$ are converted into digital signals through the converters in the interface 31. The actual speed signal $V_p$ is converted into a digital signal corresponding to the actual vehicle speed through the F-F converter, and is read into a microcomputer of the control unit 39 in a voice synthesizer 38. The voltage signal $V_s$ is obtained by the speed setting lever when the lever 2 is shifted rightward from the leftmost off-position to a required set speed position, as shown in FIG. 2.

The electronic volume control 34' in the car-radio 37 is provided for reducing car-radio sound volume while voice warning information is indicated to the driver.

The numeral 38 denotes a voice synthesizer using a linear prediction coding (LPC) system including three LSI units, a memory unit (ROM) 40, a synthesizer unit 41 (oscillators, filters, and D-A converters), and a control unit or microcomputer 39. This control unit 39 is a microcomputer comprising a CPU for controlling all the operations, a memory (ROM) for storing programs and fixed data, a memory (RAM) for storing input/output data, a clock oscillator and so on.

The control unit 39 processes the above-mentioned inputted signals through the interface 31, and control the voice synthesizer unit 41, according to a program and using the method of time sharing; that is to say, the unit 39 serves as a controller for the microcomputer and the voice synthesizer unit 41. Further, the power is supplied to the whole system when the ignition switch is turned on.

Figure 4:
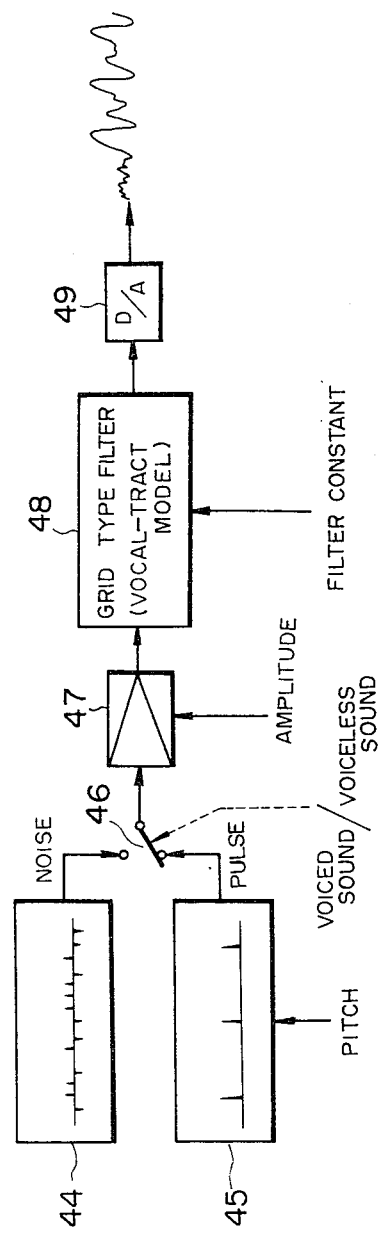
FIG. 4 is a schematic block diagram of assistance in explaining the theory of operation of a voice synthesizer using a linear prediction code system.

As is well known in the art, a voice synthesizer based on the LPC system has recently been put on the market at a reasonable price by Texas Instrument Incorporated of the USA. FIG. 4 shows schemaically the principle of operation of this voice synthesizer.

In this synthesizer, pseudo-random noise signals N generated from the first sound source oscillator (white noise generator) 44 are selected by a switch 46 to produce voiceless sounds, and periodic impulse signals P generated from the second source oscillator (impulse generator) 45 are selected by the switch 46 to produce voiced sounds. After being amplified by an amplifier 47, these signals N and P are formed into a voice sound by a grid-type filter 48 where the resonance characteristics of the human vocal tract (vocal organs such a tongue and lips located above the vocal chords) in speaking are modeled, and are outputted as a synthesized voice signal after conversion into an analog signal through a D-A converter 49.

The different values of constants such as the pitch of the periodic impulse signal, the distinction between voiced and voiceless sounds, the ratio of the amplification of the amplifier 47, and the filter constant of the grid-type filter 48, are stored in the memory unit (ROM) 40 of FIG. 3.

The voice synthesizer unit 41 comprises various circuits which correspond to a first sound source oscillator 44, a second sound source oscillator 45, a switch 46, an amplifier 47, a grid-type filter 48, a D-A converter 49 so that the synthesized voice sound signal $V_s$ necessary for excess speed warning information can be output after being controlled according to the output signal selected by the control unit 39.

The voice signal $V_s$ outputted from the voice synthesizer 38 is adjusted by means of an electronic volume control 42, amplified by an amplifier 43, and outputted through a speaker 36 provided in the car-radio 37.

In this case, the microcomputer in the control unit 39 determines the voice output volume according to a sound volume value as set by the volume control 34 provided in the car-radio 37 (determined by the use of a signal $S_{VR}$) and outputs a voice volume control signal $C_v$ through the interface 31 to the electronic volume control 42, so that the voice volume can be adjusted to an appropriate level being based on driver preference. Further, when voice-form warning information on excess speed is produced through the speaker 36 of the car-radio 37, the control unit 39 sends a sound volume control signal $C_v'$ to an electronic volume control 34' in the car-radio 37 to reduce the car-radio sound volume.

In the second embodiment, various processes are executed by the control unit (microcomputer) 39 in accordance with a program. In more detail, since the interface 31 includes an F-F converter and a V-F counter as explained in FIG. 1, a step-up excess speed information signal of the actual vehicle speed is generated in the interface 31 and is sent to the control unit 39. In accordance with a program stored in the ROM, the control unit 39 executes the same processes as explained in the discriminator 11 of FIG. 1. That is to say, the program compares the current excess speed information signal $D_c$ with the preceding signal stored in the memory; if different, the program opens a gate to input the excess speed information signal $D_c$ to the voice synthesizer unit 41 to inform the driver of voice information; if the same, the program activates an alarm generator.

In the above embodiments, only the case where the present invention is applied to a vehicle speed warning system has been described. Howevr, it is, of course, possible to apply the present invention to various voice-form warning system such as, for example, unclosed door, seat-belt putting-on, lamp putting-out, shortage of fuel, coolant, battery liquid, washer liquid and so on.

According to the present invention, since warning information is first indicated to the driver in voice-form and next an intermittent alarm sound is produced, the driver can know the warning correctly and take a proper action. Further, it is possible to eliminate an annoyance such that the same voice information is produced repeatedly and to prevent the driver from forgetting the warning.

It will be understood by those skilled in the art that the foregoing description is in terms of a preferred embodiment of the present invention wherein various changes and modifications may be made without departing from the spirit and scope of the invention, which is to be defined by the appended claims.

What is claimed is:

1. A voice warning system for an automotive vehicle, said system comprising:
 (a) at least one sensor for periodically detecting various signals indicative of various vehicle operating conditions;
 (b) at least one vehicle operating-condition presetting device for presetting various signals indicative of various preset vehicle operating-conditions;

(c) comparator means responsive to signals developed by said at least one of said sensors and said at least one of said vehicle operating-condition presetting devices for developing voice information control signals when said signals applied to said comparator means are unequal to each other;

(d) discriminator means responsive to said comparator means for detecting variation in one of the control signals from said comparator means, and for developing (1) the control signal when the control signal varies and (2) an alarm signal when the control signal does not vary after the control signal has once been developed by said comparator means;

(e) a voice selector responsive to the control signal of said discriminator means for selecting one of a plurality of designation signals stored therein;

(f) a voice output unit responsive to said alarm signal of said discriminator means for producing an alarm sound;

whereby warning information is first supplied to the driver in voice-form and then in alarm sound form if the voice warning information is not responded to.

2. A voice warning system for an automotive vehicle as set forth in claim 1, wherein said discriminator means comprises:

(a) a memory for temporarily storing a preceding voice information control signal;

(b) a coincidence counter for outputting a gate signal when a present voice information control signal differs from the preceding voice information control signal stored in said memory; and (c) a gate for passing the present voice information signal to said voice selector in response to the signal from said coincidence counter, whereby warning information is first supplied to the driver in voice-form only when the voice information signal varies.

3. A voice warning system for an automotive vehicle as set forth in claim 2, wherein said discriminator further comprises:

(a) a first AND circuit for outputting a car radio volume reducing signal in response to the gate signal from said coincidence counter and the voice information control signal when the present voice information control signal differs from the preceding voice information control signal stored in said memory; and (b) a second AND circuit for outputting an alarm signal to said alarm generator in response to the gate signal from said coincidence counter and the voice information control signal when the present voice informatin signal coincides with the preceding voice information signal stored in said memory;

whereby voice warning information is supplied to the driver while car-radio sound volume is reduced and the alarm sound is produced for the driver without reducing the car-radio sound volume.

4. A voice warning system for an automotive vehicle as set forth in claim 3, wherein said discriminator means further comprises:

(a) an OR circuit for outputting a signal to the inputs of said two AND circuits and only when the voice information control signal is developed;

(b) a first inverter for reversing the potential of said coincidence counter output to open said gate; and (c) a second inverter for reversing the potential of said coincidence counter output to open said first AND circuit for car-radio volume reduction.

5. A voice warning system for an automotive vehicle as set forth in claim 1, wherein said voice selector and said voice output unit include:

(a) an interface for controlling the input/output of the various signals from said sensors; and (b) a voice synthesizer comprising:

(1) a voice synthesizer unit having a first sound source oscillator for generating pseudo-random noise signals, a second sound source oscillator for generating periodic impulse signals, a grid-type filter, and a D-A converter for converting the digital voice signal to an analog voice signal;

(2) a memory unit for storing voices synthesized by said voice synthesizer unit; and (3) a control unit formed by a microcomputer having a CPU, a read only memory for storing programs and fixed data, a random access memory, and a clock oscillator, for controlling input/output of the various signals through said interface and for producing different items of voice information through said synthesizer unit.

6. In an automotive vehicle, a voice warning system comprising:

sensor means for detecting various vehicle operating conditions;

preset means having stored therein various preset vehicle operating conditions;

comparator means responsive to said sensor means and said preset means for generating a control depending upon relative values of corresponding signals developed by said sensor means and said preset means;

discriminator means responsive to said comparator means for detecting variation of said control signal and for developing (1) said control signal upon variation of said control signal following generation thereof from said comparator means and (2) an alarm signal upon non-variation of said control signal following generation thereof by said comparator means;

means responsive to said control signal of said discriminator means for generating a voice warning signal; and means responsive to said alarm signal for thereafter producing an alarm sound.

* * * * *

UNITED STATES PATENT OFFICE
CERTIFICATE OF CORRECTION

Patent No. 4,359,714                Dated November 16, 1982

Inventor(s) MASAKAZU TSUNODA and KAZUYUKI MORI

It is certified that error appears in the above-identified patent and that said Letters Patent are hereby corrected as shown below:

Please correct claim 1 as follows.

1. A voice warning system for an automotive vehicle, said system comprising:

(a) at least one sensor for periodically detecting various signals indicative of various vehicle operating conditions;

(b) at least one vehicle operating-condition presetting device for presetting various signals indicative of various preset vehicle operating-conditions;

(c) comparator means responsive to signals developed by said at least one of said sensors and said at least one of said vehicle operating-condition presetting devices for developing voice information control signals when said signals applied to said comparator means are unequal to each other;

(d) discriminator means responsive to said comparator means for detecting variation in one of the control signals from said comparator means, and for developing (1) the control signal when the control signal varies and (2) an alarm signal when the control signal does not vary after the control signal has once been developed by said comparator means;

(e) a voice selector responsive to the control signal of said discriminator means for selecting one of a plurality of designation signals stored therein;

UNITED STATES PATENT OFFICE
CERTIFICATE OF CORRECTION Page 2 of 2

Patent No. 4,359,714    Dated November 16, 1982

Inventor(s) MASAKAZU TSUNODA and KAZUYUKI MORI

It is certified that error appears in the above-identified patent and that said Letters Patent are hereby corrected as shown below:

(f) a voice output unit responsive to said [alarm signal of said discriminator means for producing an alarm sound] voice selector for outputting voice information corresponding to the voice designation signal from said voice selector; and (g) an alarm generator responsive to said alarm signal of said discriminator means for producing an alarm sound;

whereby warning information is first supplied to the driver in voice-form and then in alarm sound form if the voice warning information is not responded to.

Signed and Sealed this

Twenty-seventh Day of December 1983

[SEAL]

Attest:

GERALD J. MOSSINGHOFF

Attesting Officer    Commissioner of Patents and Trademarks